United States Patent [19]
Sorensen et al.

[11] Patent Number: 5,438,685
[45] Date of Patent: Aug. 1, 1995

[54] VEHICULAR ADAPTER POCKET AND HANDLE ASSEMBLY

[75] Inventors: Robert L. Sorensen, Sunrise; Samandar V. Hosseini, Ft. Lauderdale; Faris S. Habbaba, Boca Raton; Craig A. Bartling, North Lauderdale; Jorge L. Garcia, Plantation, all of Fla.

[73] Assignee: Motorola, Inc., Schaumburg, Ill.

[21] Appl. No.: 157,558

[22] Filed: Nov. 26, 1993

[51] Int. Cl.⁶ .......................... H04B 1/03; H04B 1/08
[52] U.S. Cl. ...................................... 455/90; 455/128; 455/348; 455/351; 361/814
[58] Field of Search ..................... 455/89, 90, 127, 128, 455/347–349, 345, 346, 351; 379/58, 437, 451; 248/280.1, 281.1; 361/725, 814

[56] References Cited

U.S. PATENT DOCUMENTS

| | | | |
|---|---|---|---|
| 3,553,585 | 1/1971 | Robertson et al. | 325/15 |
| 3,824,465 | 7/1974 | Blough | 455/90 |
| 4,091,318 | 5/1978 | Eichler et al. | 320/2 |
| 4,616,798 | 10/1986 | Smeenge et al. | 248/281.1 |
| 4,892,486 | 1/1990 | Guzik et al. | 439/248 |
| 4,955,071 | 9/1990 | Wong et al. | 455/90 |
| 5,185,911 | 2/1993 | Upson | 29/401.1 |
| 5,187,646 | 2/1993 | Koch | 361/395 |

OTHER PUBLICATIONS

"Introduction To Kinematics And Mechanisms" in: Erdman, A. F., Sandor, G. N. *Mechanism Design: Analysis and Synthesis,* Prentice-Hall, Inc., New Jersey, 1984, pp. 1–10.

"Displacement And Velocity Analysis" in: Erdman, A. F., Sandor, G. N., *Mechanism Design: Analysis and Synthesis,* Prentice-Hall, Inc., New Jersey 1984, pp. 68–71.

*Primary Examiner*—Edward F. Urban
*Assistant Examiner*—Chi H. Pham
*Attorney, Agent, or Firm*—M. Mansour Ghomeshi; Juliana Agon

[57] ABSTRACT

A converter console (10) includes a base (36) having a hinge axis (127) at a rearward end and a vertical extension (311) having a base mounting joint (29) at the tip of the extension at a front end. A radio receiving pocket (25) has a handle mounting joint (411) at a first end and a hook (27) at a second end, corresponding to the ends of the base for pivotally mounting the hook around the hinge axis. A collapsible linkage (15) couples the pocket (25) to the base (36) between the base mounting joint (29) and the handle mounting joint (411) for pivotally raising and lowering the pocket and for clamping the pocket down.

8 Claims, 6 Drawing Sheets

FIG.7
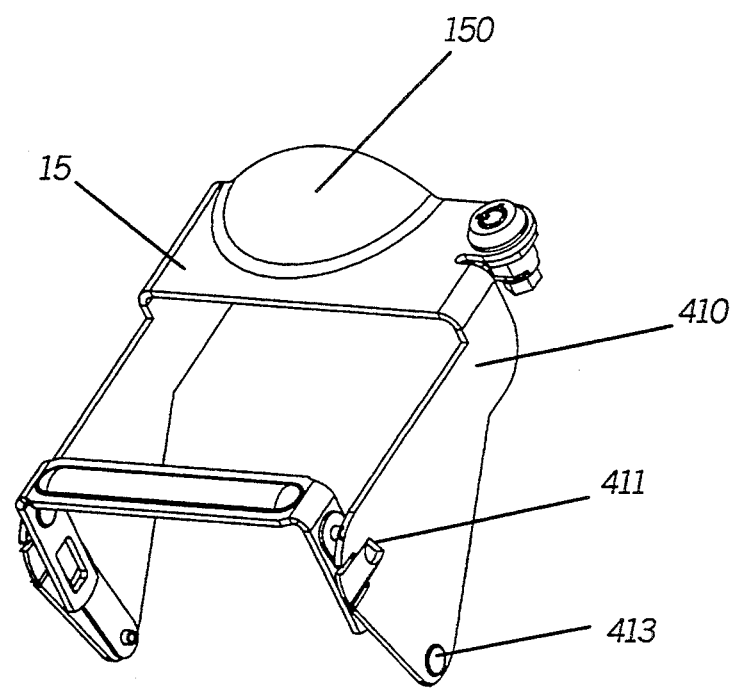
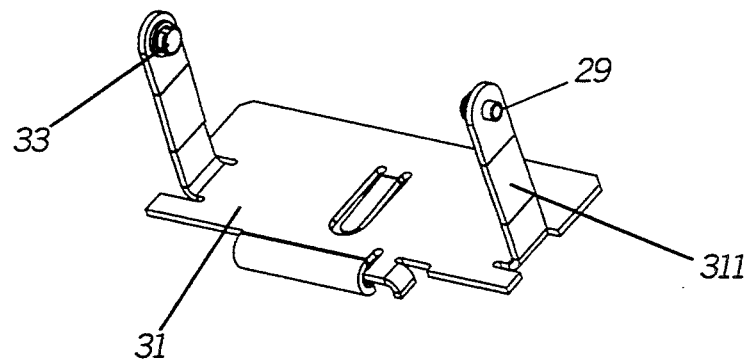

1

VEHICULAR ADAPTER POCKET AND HANDLE ASSEMBLY

TECHNICAL FIELD

This invention relates in general to a converter console for converting a portable radio to mobile operation and more specifically to a converter console which allows easy installation of the portable radio.

BACKGROUND

In general, converter consoles are utilized for charging communication devices such as portable radios within a vehicle or for converting portable radios to mobile operations so that duplicate equipment is not required. Since a portable radio might be inserted into a converter console many times each day, it is essential that the insertion and release of the radio is easy and reliable. At the same time, prevention of damage while the portable radio is contained within the console is very important, especially while driving over rough terrains or otherwise rugged environments. In order to optimize the design for assembly, the converter console should be ideally assembled with a minimum number of parts.

SUMMARY OF THE INVENTION

Briefly, according to the invention, there is provided a base having a hinge axis at a rearward end and a vertical extension having a base mounting joint at the tip of the extension at a front end. A radio receiving pocket has a handle mounting joint at a first end and a hook at a second end, corresponding to the ends of the base for pivotally mounting the hook around the hinge axis. A collapsible linkage couples the pocket to the base between the base mounting joint and the handle mounting joint for pivotally raising and lowering the pocket and for clamping the pocket down.

BRIEF DESCRIPTION OF THE DRAWINGS

FIG. 7 is a an assembly drawing of the mounting bracket 31 and the U-shaped handle 15 of FIG. 1.

DETAILED DESCRIPTION OF THE PREFERRED EMBODIMENT

Although directional terms, such as "horizontal", "lower", "downward", etc., are used throughout this specification for convenience of explanation it will be understood that these are merely relative terms and are not meant to be a limitation.

A mechanism is a mechanical device that has the purpose of transferring motion or force from a source to an output. A linkage consists of links or bars, generally rigid, which are connected by joints, such as pins (or revolutes), to form open or closed chains or loops. Such kinematic chains, with at least one link fixed, become mechanisms if at least two other links retain mobility, or structures if no mobility remains. Thus, a mechanism permits relative motion between its rigid links; a structure does not. Hence, linkages make simple mechanisms and can be designed to perform complex tasks, such as nonlinear motion and force transmission.

Mechanisms exhibit two-dimensional, plane, or planar motion when all the links move in parallel planes. Planar rigid-body motion consists of rotation about axis perpendicular to the plane of motion and translation— where all points in the body move along identical straight or curvilinear paths and all lines embedded in the body remain parallel to their original orientation.

The simplest closed-loop linkage is the four-bar, which has three moving links plus one fixed link and four pin joints. The present invention uses the four-bar linkage in its simple opening and closing operation of the converter console.

Figure 1:
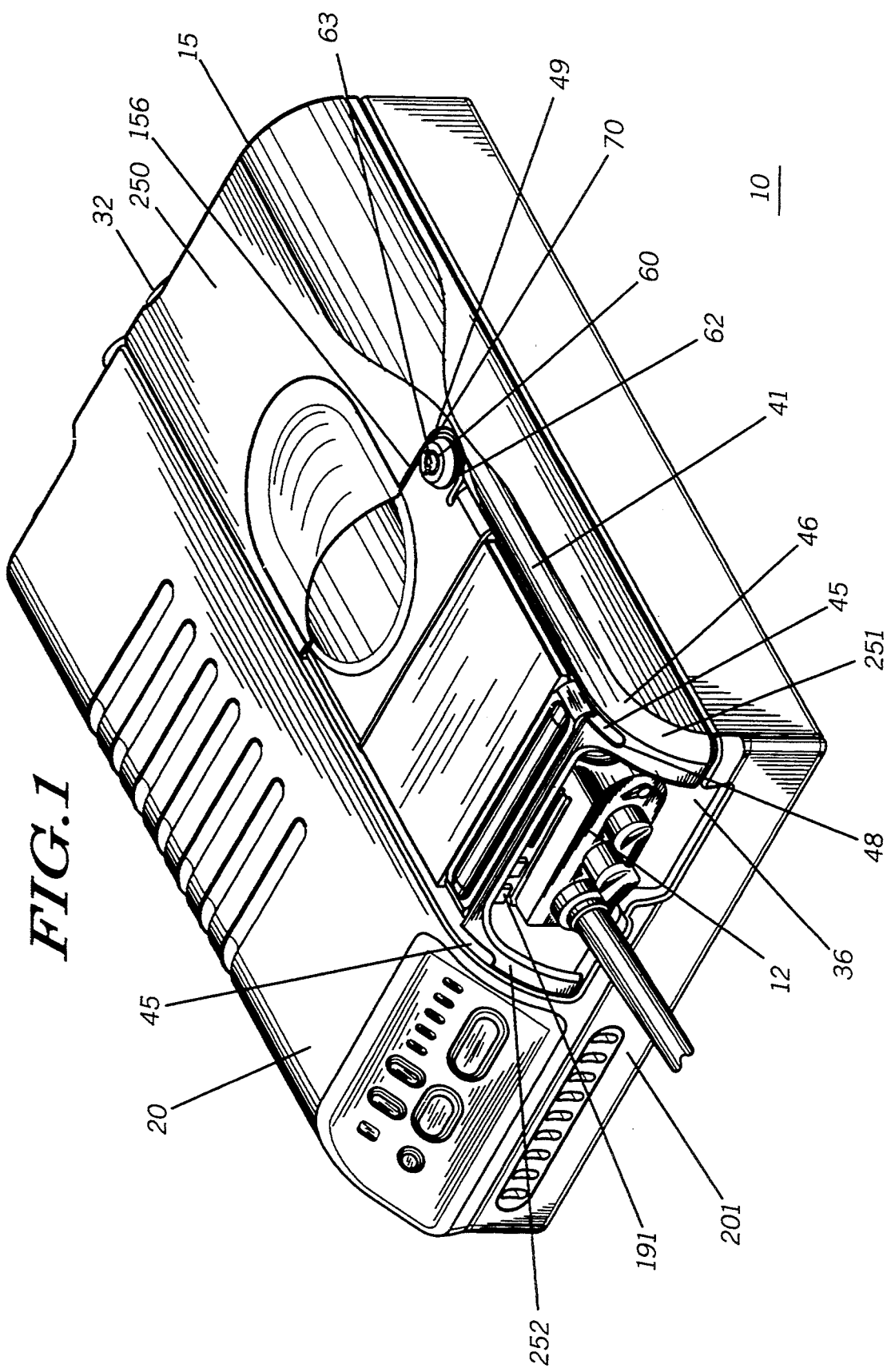
FIG. 1 is a perspective view of a converter console, in a loaded position, in accordance with the present invention.
Figure 2:
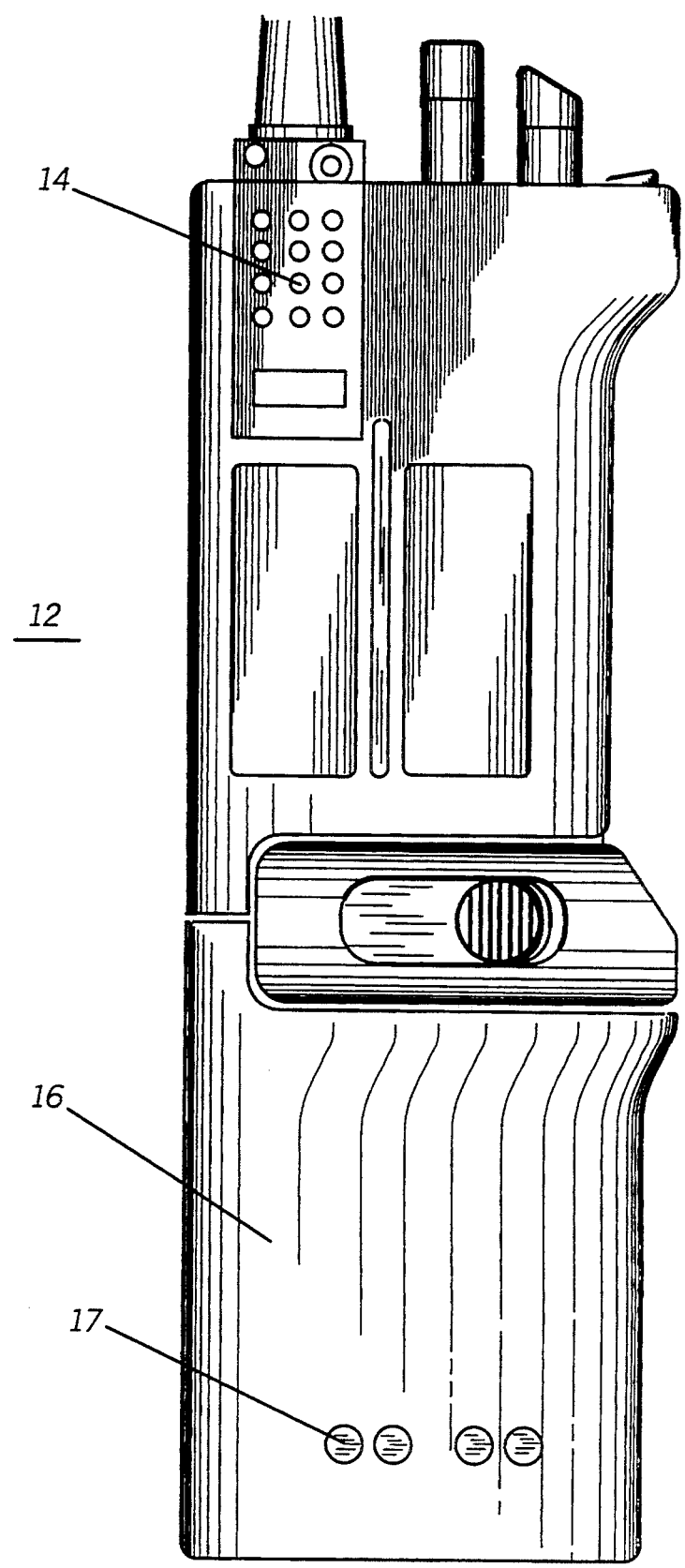
FIG. 2 is a backview of a portable radio which may be used with the converter console 10 of FIG. 1.
Figure 3:
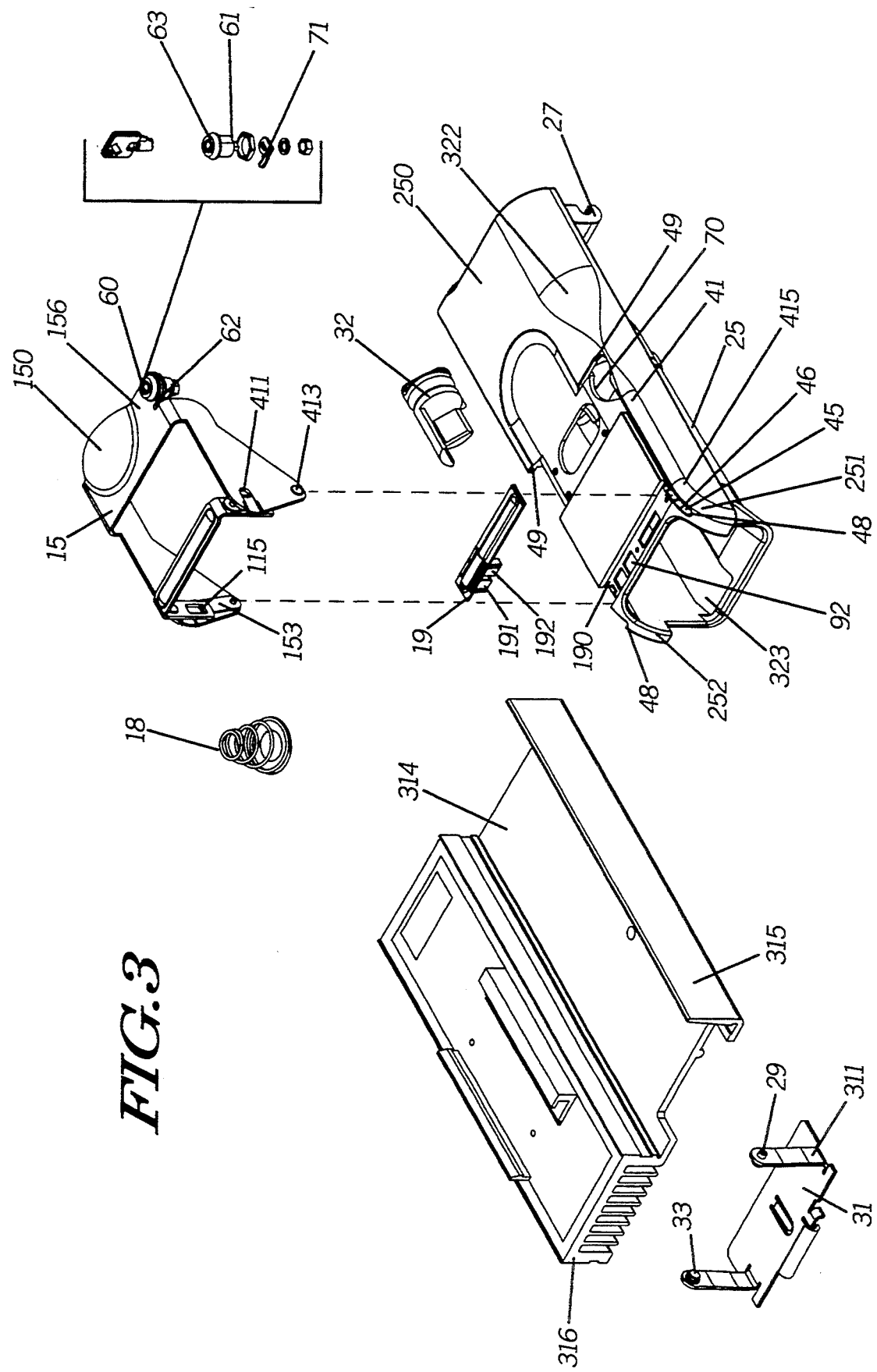
FIG. 3 is an exploded perspective view of some portions of the converter console 10 of FIG. 1.
Figure 4:
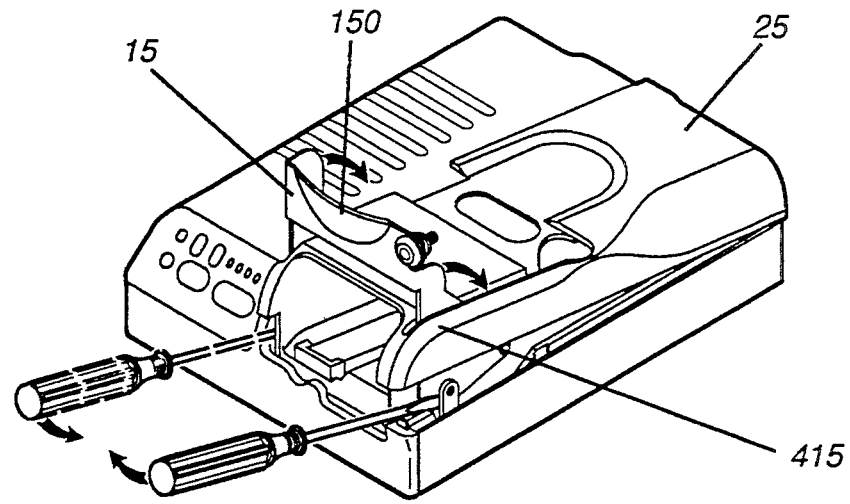
FIG. 4 is a perspective view of the converter console of FIG. 1, readied for pocket disassembly.
Figure 5:
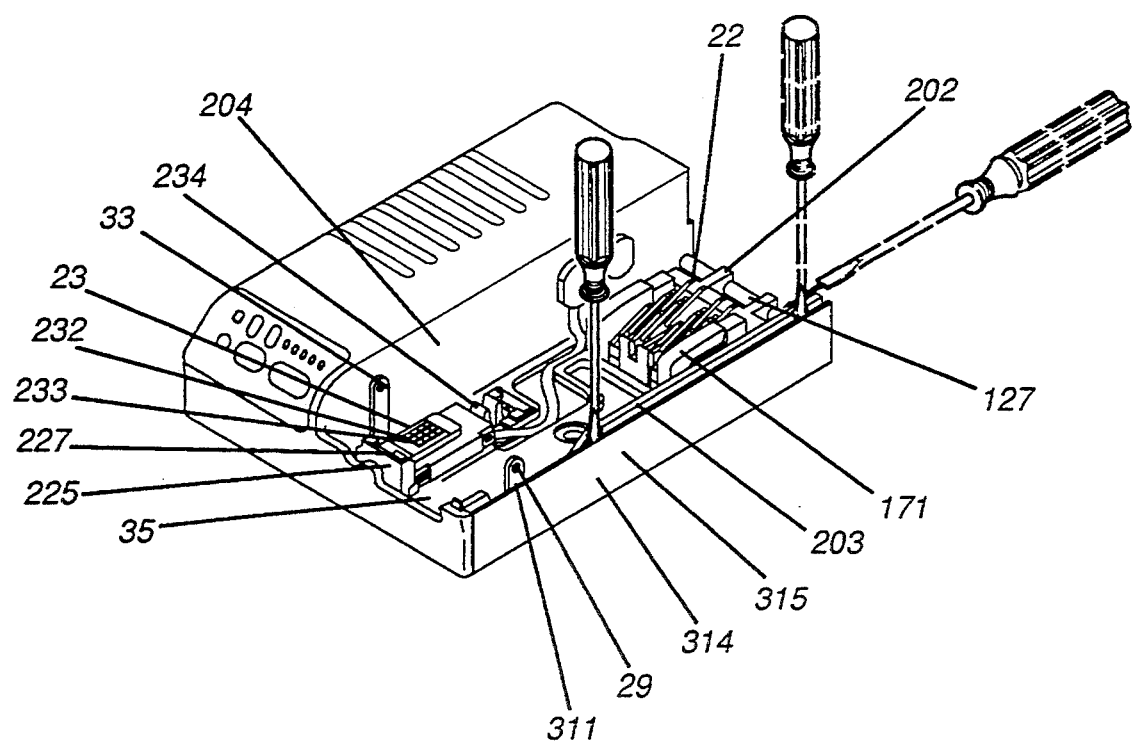
FIG. 5 is a perspective view of the converter console of FIG. 1, readied for base disassembly.
Figure 6:
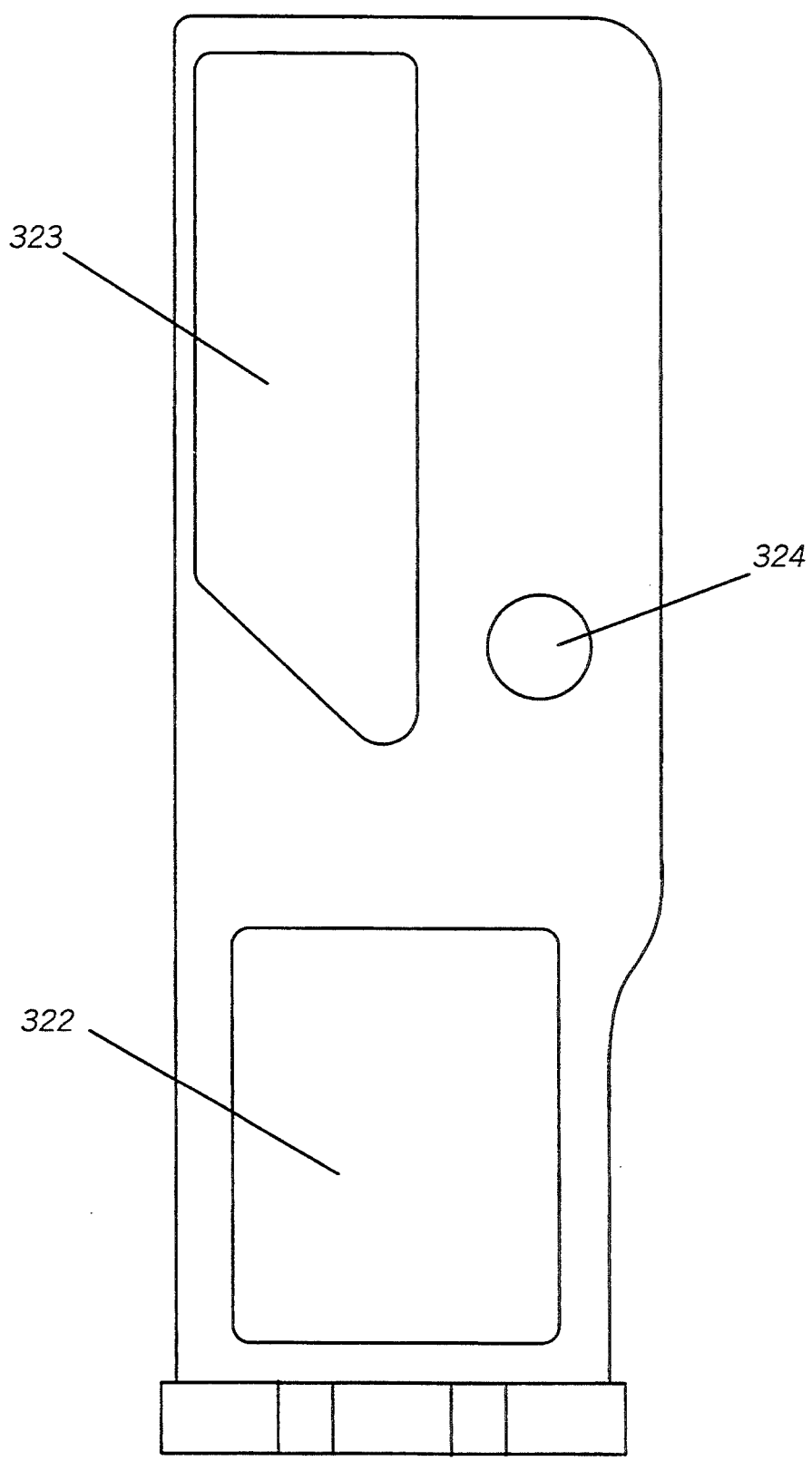
FIG. 6 is a backview of the pocket 25 of FIG. 1.

Referring to FIGS. 1–7, a converter console 10 is adapted to receive a portable radio 12. Portable radio 12 includes a universal connector 14 which provides external contacts for shifting or converting control of the portable radio 12 to remote controls, for example, to a remote microphone or to radio controls 15 of the converter console 10. Portable radio 12 also has a battery 16 and externally accessible power contacts 17 through which the battery 16 can be charged or replaced by the power supply of a vehicle.

Converter console 10 includes a housing 20 adapted to be mounted on the vehicle by some convenient means, such as a pair of mounting rings. When possible, the console 10 should be mounted on the floor near the center of the vehicle.

For electrical coupling, the housing 20 has power contacts 22, one row of contact which will mate with a particular sized radio, surrounded by a radio bumper 171, and has a self-retaining self-aligning universal connector assembly 23, both of which are designed to mate with the power contacts 17 and the universal connector 14, respectively, of the portable radio 12.

A bottom integral part of the housing 20 forms a bottom housing or a base 36. This base 36 further includes a front housing member 201, a rear housing member 202, and first 203 and second 204 side housing members connected together to form a channel or cavity 35, extending along one side of the base's upper surface, open at the top and front, and designed to receive a body having an opening, such as an elongated radio sleeve or pocket 25.

The base 36 extends upwardly at the front end of the channel 35 and is designed to receive the universal connector assembly 23. The universal connector assembly 23 includes a resiliently sealed universal connector contact carrier cover 232 mounted on top of a universal connector contact carrier 233 which rests on a universal connector dual-axis spring 234. The cover 232 has holes for the protruding contacts for sealing around each individual contact point and the dual-axis spring floats with the radio during shock or vibration if the radio 12 moves slightly.

The contact carrier 233 includes an integral locating nest 225 which extends upwardly at the front end of the channel 35. Preferably, the nest 225 has downwardly sloping surfaces 227 to allow the nest to locate the carrier 233 to the radio contacts 14.

For mechanical attachment of the pocket 25 to the base 36, the base 36 has a hinge axis 127 at a rearward end of the rear housing member 202. A vertical extension 311 from a lower sheet-metal U-shaped mounting bracket 31, wrapped around the bottom side of the base 36, extrudes from each of the front ends of the first and second side housing members 203 and 204. A metal chassis 314 supports and receives the base 36 with an exterior sidewall 315 on one side and a heatsink 316 on the other side. Preferably, this lower sheet-metal U-shaped mounting bracket 31 is formed as an attachment part, to fit within the narrow gap between the first side housing member 203 and the sidewall 315 and the gap between the second side housing member 204 and the heatsink 316. Each extension 311 includes an enlarged head, pin, or rivet 33, preferably in the shape of a "D", for making a base mounting joint 29 at the tip of the extension.

The pocket 25 receives the portable radio 12 in a nesting engagement with the rest of the housing 20. A universal connector aperture 323 and a power contact aperture 322 on the bottom of the pocket 25 allows the integral nest 225 and the power contacts 22 of the housing, respectively, to protrude through the pocket 25 when the pocket 25 is lowered. Preferably, the pocket 25 and the base 36 are molded from a structural foam material which allows many cosmetic and mechanical features, such as very thick wall sections, to be integrated onto the same part to achieve the desired strength, without having problems, such as sink marks, warping, or deformation. Fabricating only one part also minimizes the number of tools needed to make the part.

The geometry of the pocket 25 allows for a wide variety of radio thickness and widths. This is accomplished by providing a generous lead-in or front opening for the radio into the pocket 25. The varying radio/battery lengths are accepted by the radio length adjuster 32 having three screwable position stops.

The pocket 25 has a handle mounting attachment pivot point 415 at a front end and at least one hook 27 at a back end, corresponding to the ends of the base 36 for pivotally mounting the hook 27 around the hinge axis 127.

A collapsible linkage such as a handle actuator subassembly 15 couples the pocket 25 to the base 36 between the base mounting pin 33 and the handle mounting attachment point 415 for pivotally raising and lowering the pocket 25 and clamping it down. The handle 15 includes a U-shaped handle having a substantial triangular wing section defined by a first angle portion 410, a second angle portion having a base mounting hole or corresponding D-slot 411, and a third angle portion having a coupler attachment point 413. An actuator side section 414 of the U-shaped handle is integrally connected to the triangular section at the first angle portion to form the two symmetrical legs of the "U".

The distance between the two moving points 411 and 413 of the triangular section forms an input link of a four-bar linkage mechanism. This input link 411–413, along with the rest of the handle, is rotatably coupled to the base mounting pin 33 which is preferably a D-rivet, at the second angle portion, to form the base mounting joint 29. The pair of base mounting holes 411 (one of which is not visible) at the second angle portion of the triangular handle wing section are slipped over the enlarged heads or D-rivets 33 of the extensions to form the first pin or revolute joint 29.

Hence, the D-rivets 33 used in the assembly of the four-bar linkage prevent accidental disassembly of the mechanism in vibration, impact, or shock. The handle 15 is assembled by introducing an angle of about 10 to 15 degrees from the fully open position, before snapping the D-slot 411 onto the D-rivet 33. This angle is not at full open, nor at full closed position, thus the unit can not come apart at these positions.

A coupler link 153 is rotatably coupled at one end to the handle mounting attachment point 415 to form a handle mounting joint 115 with the pocket 25. On the other end, the coupler link 153 is rotatably coupled to the coupler attachment point 413 of the triangular section of the handle at the third angle portion 410.

By these interconnections, a four-bar linkage mechanism is provided on each side of the pocket 25. Every four-bar linkage has three moving links plus one fixed link and four pin joints. From a side-view, the vertical mounting extension 311 forms the first or fixed link with the hinge axis 127. The handle serves as the second or input link 411–413. The handle wing of the input link 411–413 is connected to the power source or prime mover, in the form of the actuator section 414. The first moving joint couples the input link to the fixed link, at the base mounting hole 411. A second moving joint, at the coupler attachment point 413 of the third angle portion, couples the input link 411–413 to the coupler link 153. This third coupler link 153, in the form of a hidden floating bar, connects the two moving pivots, the first moving pivot at the coupler attachment point 413 of the third angle portion of the triangular wing and the second moving pivot at the front-side of the pocket at the handle mounting joint 415, to couple the input link 411–413 to the output link. The side of the pocket, from the handle mounting point 415 to the hook 27 attachment point serves as this fourth or output link to connect the second moving pivot, the third moving joint at the handle mounting point 415 to the ground pivot, at the back end of the pocket by way of the hook 27 of the pocket 25. This third moving joint, at the second moving pivot, thus couples the coupler link 115 to the output link at the handle mounting joint 415 of the pocket. A fourth moving joint couples the output link to the fixed link, at the hinge axis 127.

Looking at the actuator handle subassembly 15 from a perspective view, instead of a side view, the two actuator side sections of the handle wings 414 are integrally and perpendicularly connected to an ergonomic actuator handle having a handle end such as a spherical ergonomic section 150 raised from the horizontal section of the "U". Preferably, the hidden or coupler bar 153 is riveted, or otherwise connected, to the handle wing at the coupler attachment point 413 of the third angle portion. Additionally, the other moving pivots of the two hidden bars or floating links 153 are also riveted, or otherwise connected, to an upper U-shaped retainer or bracket 125, at handle mounting point 115, to complete the handle subassembly 15.

Since the power contacts 22 and the pocket 25 is designed to accommodate different radio sizes, two resilient pads, the universal connector cover 232 and a compressor pad 19, hold the radio and account for the thickness tolerances of the radio and pocket assembly. The horizontal section of the U-shaped bracket 125 is pressed against a compressor pad 19, on top of a receiving channel 190 of the pocket 25. Two bottom resilient protrusions 191 and 192 of the pad 19 press through apertures 91 and 92, to press against a strategic position on the front side or lip of the radio 12 to maintain good universal contact on the other side of the radio and prevent the pad from being pull-out when it is hit by the radio. This strategic pad position can be over the radio lip or other locations where dimensional variations are minimal between different radio types.

This converter console can thus accommodate a wide variety of radio sizes or types because of the arrangement of the pocket and its surrounding environment. Since the spacing between battery power contacts 17, the position of the radio lip and of the radio universal connector 14 do not vary across different radio types in a way that can significantly affect the applied loads, the bumper 171 secures the radio 12 at a selected row of the power contacts 22. The compressor pad 19 applies force to the top lip of the radio thereby securing the radio universal connector 14 to the unit's locating nest 225.

To form a stop or provide additional guidance means for the four-bar linkage to prevent an undesired rotational direction, a top console housing cover 250 is integrally formed with the pocket 25, in a manner to provide a pair of guideways 251 and 252, in the form of slots 45 (one of which is not visible) on opposite sides, along the top front end of the cover 250 and adjacent the pocket's sides to receive portions of the handle assembly 15. One side of the near-center slot 45 is formed by the second side housing member 204 of the converter housing in the extending upward portion of the base 36. Guideways 45 each include a generally horizontal section 41 ending in a front curve 46 for receiving the triangular handle wing section.

The front curved sections 46 are each constructed with a front lower end or stop 48 to define an unloaded position for the pocket 25. When the straight leg edge 152 of the "U" shaped handle, near the first angle section rests against this end 48, the front end of the pocket will be at its highest position. This edge 152 forms part of the longest side of the triangle section and has a distance greater than the distance between the coupler attachment point 413 and the base mounting hole 411, and sufficiently long enough to make connection with the handle end (150).

The top of the housing cover 250 is indented to expose a front-center portion of the underlying pocket 25 for recessing the horizontal section of the "U" shaped handle when it is lowered. Thus, this top recessed front-center portion of the covered pocket also provides a stop to the linkage mechanism. For defining a loaded position for the pocket, an upper end or stop 49 at the edge of the recessed front-center covered-pocket portion, on top and near a center-cut of the housing cover 250 is sufficiently close to the spherical raised section 150 end of the handle, when the handle is maximally lowered, within the slots 45, to provide an integral and closed look as part of the top of the housing 20, while providing finger accessibility.

With the provided stops, this four-bar linkage mechanism is also called a double-rocker mechanism because the stops 48 and 49 limit the rotations of both the input 411–413 and output (pocket's side) links 411–413 and the side of the pocket, from the handle mounting point 415 to the hook 27 attachment point. With the sides of the retainer bracket 125 and of the handle wing section slipping through the slots 45 of the integrated top housing 250 and pocket 25, a stand-alone pocket and handle assembly is formed.

To assemble or selectively attach this pocket and handle assembly onto the base 36, the pocket 25 rear hook or pivot 27 is first angled into the housing hinge axis 127. The hooks 27 are simply hinged, or otherwise, positioned around the hinge axis 127 of the base 36 to downwardly rotate the pocket 25. With the spherical section 150 of the handle raised, to align the handle assembly D-slots 411, opposing sides of the handle wings are squeezed inwardly, as they are lowered, to snap-fit the enlarged heads 33 of the mounting bracket 31 into the handle assembly D-slots 411. The pocket acts as one of the four rigid links of the four link mechanism. The pocket and handle assembly is rotated down such that the D-rivets 33 of the lower bracket 311 can be snapped on to the handle assembly D-slots 411. This simple procedure completes the assembly of the four bar linkage. To selectively detach or remove the pocket and handle assembly, the reverse of the assembly procedure can be followed.

This ergonomic spherical handle section 150, connected as the primer mover source of the four-bar linkage, makes the leverage operation of the handle obvious, as to opening and closing of the pocket, and easy to operate, even though the underlying linkage, which enables the easy operation, is hidden to the user. In the operation of the converter console 10, assume that the pocket 25 is in the unloaded position and empty. As the pins 33 of the mounting bracket 31 are rotatably inserted in the handle assembly D-slots 411 of the handle wings, the coupling link or bar 153 is rotated towards a vertical position, with the handle mounting point 415 higher than the coupler attachment point 413, such that the opening of the pocket 25 is positioned above the base 36 for easy access. From this unloaded position, it is obvious that the radio 12 slides into the open pocket. It is thus obvious how to open, close and lock the pocket using the handle.

Portable radio 12 is easily inserted into the pocket 25 and the pocket 25 is easily moved downwardly and latched relative to the base 36 by downward rotatable movement of the spherical actuator handle section 150, connected as part of the four-bar linkage. As the moving pivot 115 of the coupler link 153 pivots downwardly, as controlled by the lowering of the actuator handle end 150 rotating downwardly along section 41 of slots 45, the coupler link 153 straightens up. Meanwhile, the attached pocket 25 at the moving pivot 115 and the hooked pivot 127 also pivot downwardly.

This four-bar linkage mechanism with the underlying spring 18 thus opens and closes the pocket 25 with minimum effort and retains the radio 12 with sufficient force to prevent the radio from moving during shock and vibration. This four-bar linkage uses the over-center principle (by locating the collinear collapsible point, where most of the linkages come together, near the front and away from the center-cut of the pocket 25) to snap or collapse itself closed to retain the radio 12. The input link distance 411–413 is about the same as the distance of the hidden bar 153 and the distance of the vertical extension 311 of the mounting bracket 31 so that when the pocket 25 is lowered, the top of the pocket at moving pivot 415 is close to the base mounting hole or D-slot 411 while the longest side of the triangle 152 is now horizontally positioned. In other words, links 411–413 and 153 collapse onto itself (at the change point, the centerlines of links 411–413 and 153 become collinear), in alignment with the bracket's extension 311 to lower the pocket 25.

This four-bar link mechanism further provides a high output force with minimal input force. The result is that the radio is secured with greater than 100 lbs. or 445 Newtons (at the battery end.) with no more than 4 lbs. or 17.8 Newtons of input force at the handle 150. These high loads in combination with the soft mounting or compression points allow for minimal radio cosmetic damage during extreme vibration.

Other advantageous features are provided in the converter console 10 other than the four-bar linkage. Along with the universal connector dual-axis spring 234, a free-standing cone-like spring coil 18, protruding from a spring opening 324 of the pocket, is mounted in between receiving cavities of the base 36 and the bottom of the pocket 25 to quickly bias the pocket 25 into either the loaded or unloaded position. The pocket 25, on top of the spring 18 and connected as part of the four-bar linkage, is then spring-loaded to snap-open when the pocket is released by a user actuating the handle 150. In the loaded position, the universal connector dual-axis spring 234 hold universal connectors 14 and 23 tightly engaged and sealed by the connector carrier cover 232 so that no electrical breaks in the contact occur regardless of the vibration caused by rough terrain or water on the components. Also, in the loaded position, the front housing member 201 extends across the lower portion of the opening in the pocket 25 to cover the universal connector locating nest 225 and the bottom of the pocket 25, in order to prevent the removal of the portable radio 12 and to protect the radio from being directly impacted by foreign objects.

A locking mechanism 60 is provided in the housing 20, as incorporated in the actuator end of the handle subassembly 15 to lock the pocket 25 and the portable radio 12 within, in the loaded position, to prevent theft of either the radio or of the converter console 10. In this embodiment, locking mechanism 60 includes a shaft 61, topped by a key lock 63, rotatably mounted in a lock aperture 62 on the actuator end 156 of the handle for placement, generally adjacent to the pocket 25 and the housing top cover 250, within the locking aperture end 49 of the guideway 251. As the key lock 63 is rotated, the shaft 61 is rotated between a locked and an unlocked position.

The locking mechanism 60 includes a radially extending projection in the form of a locking pawl 71. With the pawl 71 underneath the handle 156, (received within a side aperture 72 of the pocket 25 if the handle is lowered), the shaft 61 is in the unlocked position. In this unlocked position, the pocket 25 can be easily moved between the loaded and unloaded positions because the pawl 71 is extended outwardly to one side and, thus, does not engage anything.

With the pawl 71, rotated approximately ninety degrees, underneath the top housing cover 250, the shaft 61 is in the locked position. However, in this locked position, the pawl 28 frictionally engages the bottom surface 70 of the pocket, thereby locking up the handle and linkage to the pocket. This arrangement substantially prevents relative movement between the pocket 25 and the housing 20. Thus, the locking mechanism 60, the resilient universal contact carder cover 232, and the resilient compressor pad 19 prevent any chatter in electrical contacts due to vibration and the like and substantially reduces wear between the universal connector 14 and universal connector assembly 23. Furthermore, the locking mechanism 60 securely locks the pocket 25 in the loaded position, because the pocket 25 must be moved upwardly before it can be moved into the unloaded position. This four-bar linkage, including the structural foam fabricated pocket, housed in a protective assembly, thus provide ergonomics and friendliness of operation while providing ruggedness to the design.

What is claimed is:

1. A converter console comprising:
    a base having a vertical extension at a first end and a hinge axis at a second end;
    a base mounting joint located at the upper end of the extension;
    a body having a handle mounting joint at a first end and a hook at a second end, corresponding to the ends of the base for pivotally mounting the hook around the hinge axis, the body having an opening for receiving a communication unit for mating with the base when the body is clamped down;
    collapsible linkage means coupling the body to the base between the base mounting joint and the handle mounting joint for pivotally raising and lowering the body and for clamping the body down, the collapsible linking means comprising;
    a handle having a substantial triangular section defined by a first angle portion, a second angle portion, and a third angle portion, and an actuator section connected to the triangular section at the first angle portion, the triangular section rotatably coupled to the base mounting joint at the second angle portion; and
    a coupler link rotatably coupled at one end to the handle mounting joint of the body and rotatably coupled to the triangular section of the handle at the third angle portion.

2. The converter console of claim 1 further comprising a locking mechanism located on the actuation section for locking the handle to the body.

3. The converter console of claim 1 further comprising a stop for stopping the pivotal rotation of the handle when the handle is sufficiently raised to allow insertion of the communication unit into the opening of the body.

4. A converter console for converting to mobile operation a portable radio, the converter console comprising;
    a housing having a front housing member, a rear housing member, and first and second side housing members connected together to form a cavity, open at the ton and front, for inserting the radio;
    a pocket having an opening for receiving the radio at a first end opposed to a second end:
    hinge means for hingedly fastening the pocket to the rear housing member, within the cavity of the housing;
    pivotal biasing means pivotally mounting the pocket to the first and second side housing members, near the front housing member for pivotally moving the pocket between an open position, wherein the opening of the pocket is substantially above the front housing member and a close position wherein a portion of the opening of the pocket is below the front housing member; the pivotal biasing means comprising;
    each of the side housing members having a vertical mounting extension for forming a fixed link with the hinge axis;
    the pocket having a handle mounting joint at each of the upper sides of the pocket, at the first end;
    a first moving joint located at the end of each of the vertical extensions; and
    a four-bar linkage having one side of the pocket as an output link, a handle as an input link, a coupler link, and the frame link, the first moving joint coupling the input link to the fixed link, a second moving joint coupling the input link to the coupler link, a third moving joint coupling the coupler link to the output link at the handle mounting joint of the pocket, and a fourth moving joint coupling the output link to the fixed link, at the hinge axis.

5. The converter console of claim 4, wherein the pivotal biasing means further comprises:

a pair of guideways formed in the pocket including a generally horizontal section and having the four-bar linkage movably engaged therein for generally pivotal movement of the pocket, the generally horizontal section of the guideways each having a lower curvilinear end which defines the close position for the pocket wherein the radio positioned within the pocket is mated with the housing, and the horizontal section having an upper end which defines the open position wherein the portable radio is easily removable from the pocket; and a spring positioned, within the cavity, between the housing and the pocket for biasing the pocket toward one of the two positions.

6. A converter console for converting to mobile operation a portable radio, the converter console comprising:

a housing;

a four-bar linkage having a portable radio receiving pocket as one of the bars;

a pair of guideways formed in the pocket including a generally horizontal section and having the four-bar linkage movably engaged therein for generally pivotal movement of the pocket, the generally horizontal section of the guideways each having a lower curvilinear end which defines a loaded position for the pocket wherein the portable radio positioned within the pocket is mated with the housing, and the horizontal section having an upper end which defines an unloaded position wherein the portable radio is easily removable from the pocket; and a spring positioned between the housing and the pocket for biasing the pocket toward the unloaded position.

7. A converter console for converting to mobile operation a portable radio, having externally accessible power contacts and a universal connector for connecting remote controls thereto, the converter console comprising:

a housing including power contacts designed to mate with the power contacts of the portable radio and radio controls connected to a universal connector designed to mate with the universal connector of the portable radio;

a four-bar linkage having a portable radio receiving pocket as one of the bars, the pocket having a universal connector aperture and a power contact aperture;

a pair of guideways formed in the pocket including a generally horizontal section and having the four-bar linkage movably engaged therein for generally pivotal movement of the pocket, the generally horizontal section of the guideways each having a lower curvilinear end which defines a loaded position for the pocket wherein the universal connector of the portable radio positioned within the pocket is mated with the universal connector of the housing, through the universal connector aperture, and the power contacts of the portable radio are mated with the power contacts of the housing, through the power contact aperture, and the horizontal section having an upper end which defines an unloaded position wherein the portable radio is easily removable from the pocket; and a spring positioned between the housing and the pocket for biasing the pocket toward one of the loaded and the unloaded positions.

8. The converter console of claim 7, wherein the universal connector of the housing includes a locating nest having sloping lead-in surfaces to facilitate alignment with the universal connector of the portable radio.

* * * * *